Figure 1:
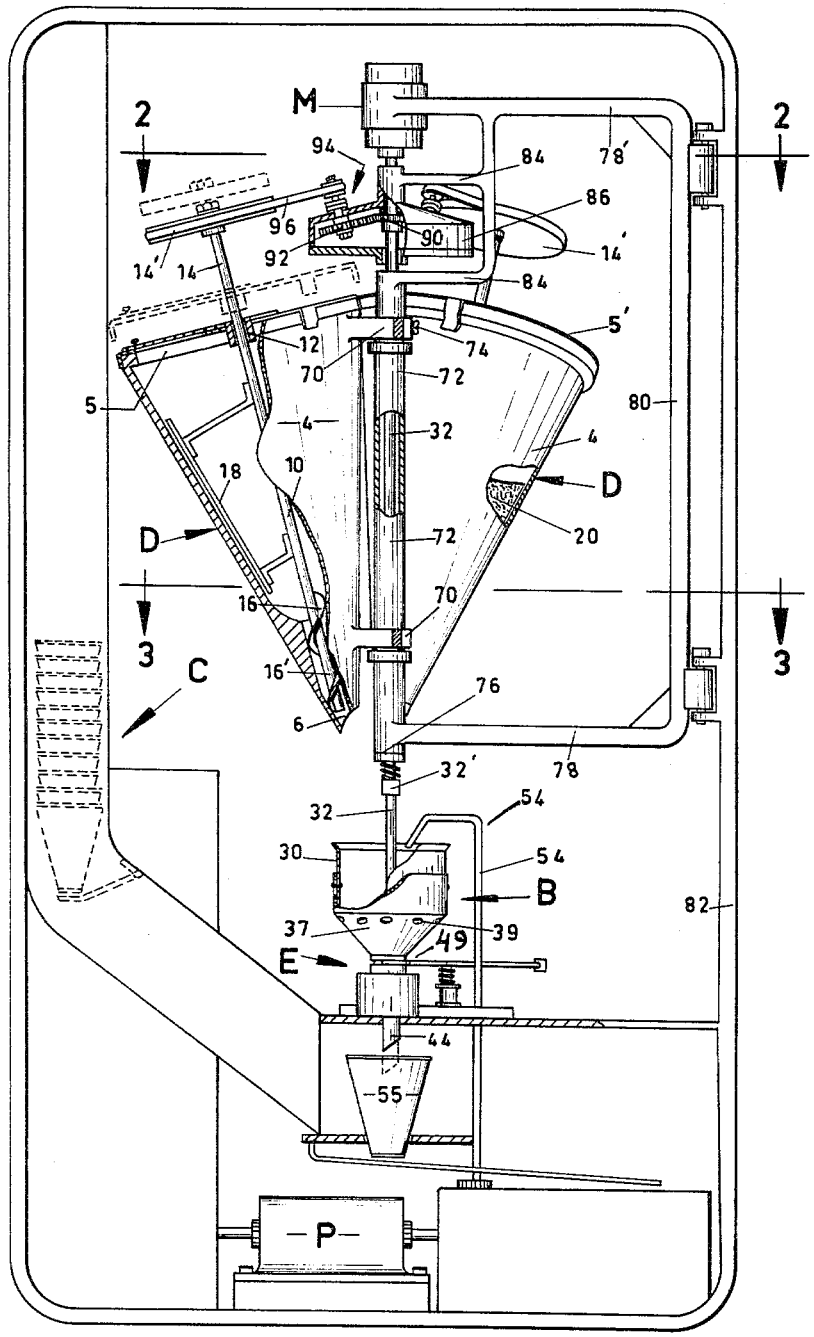

Feb. 22, 1966    J. N. STUTZ    3,236,270
AUTOMATIC BEVERAGE DISPENSING MACHINE
Filed Nov. 14, 1962    2 Sheets-Sheet 1

INVENTOR.
JOSEPH N. STUTZ
BY
Leon Arthurs
agent

Feb. 22, 1966 J. N. STUTZ 3,236,270
AUTOMATIC BEVERAGE DISPENSING MACHINE
Filed Nov. 14, 1962 2 Sheets-Sheet 2

INVENTOR.
JOSEPH N. STUTZ.
BY
Leon Arthurs
agent

United States Patent Office 3,236,270
Patented Feb. 22, 1966

3,236,270
AUTOMATIC BEVERAGE DISPENSING MACHINE
Joseph N. Stutz, Toronto, Ontario, Canada, assignor to Vendbar Industries Limited, a corporation of the Province of Ontario
Filed Nov. 14, 1962, Ser. No. 237,640
5 Claims. (Cl. 141—104)

The present invention relates to automatic machinery—usually, although not necessarily, coin operated—for preparing and delivering beverages; particularly cold beverages produced by dispersing a dry concentrate in a refrigerated liquid carrier or vehicle such as water for example.

The dispensing of beverages, both hot and cold, by automatic machinery is not basically new art. Indeed, machinery for this purpose has been in relatively widespread use for a number of years. What is noteworthy, however, is that the cold beverages heretofore produced by such machinery have been prepared by dispersing in the said refrigerated liquid a "wet" or liquid concentrate instead of the dry concentrate contemplated by this invention which has been used theretofore more or less exclusively in connection with heated beverages such as soup, coffee, and so forth.

For the sake of clarity, it should be pointed out that in this preferred embodiment of the invention, the dry concentrate or beverage base visualized is provided in a granular, powdery, or like comminuated and reduced state. For simplicity, such state is hereinafter generically referred to as powdered; the substance itself being referred to as a powder. Moreover, but also only for the sake of clarity and simplicity, water may sometimes be referred to as the specific liquid vehicle in which said powders are dispersed to form a beverage but this is subject to the understanding that the term water as used herein comprehends as well all other liquids which serve the same purpose.

It will be appreciated that, in dealing with beverage dispensing machinery, time is a factor of considerable commercial importance. That is to say, commercial considerations make it extremely desirable that each beverage preparation and dispensing operation or cycle be effected in the shortest possible time and it was mainly on this account that the more readily soluble liquid concentrates have heretofore been preferred as beverage bases in machines of the presently contemplated character.

On the other hand, a powdered base has many alternative advantages which, apart from the time factors, make them much more desirable for the contemplated purposes than liquid concentrates. For example, powder offers the advantages of cleanliness, sanitation, stability, and others of the same general class. Paramount amongst the advantages, however, is the fact that less problem and difficulty is encountered in the preservation of powders than in the preservation of liquid concentrates and this is a most important consideration in the art of beverage dispensing machinery whose economic yield also depends very heavily on the capacity of the machinery to function efficiently and reliably between widely spaced servicing calls.

One of the main objects of the invention is, therefore, to provide machinery capable of preparing and dispensing powder-base beverages at relatively high speed.

Moreover, while the present invention is concerned with the provision of a—so-called—universal machine capable of use in the production of either hot or cold beverages utilizing either wet or dry ingredients dispersed in either heated or refrigerated water, another of its main objects, in actual fact, is to provide machinery which is capable, amongst other things, of producing commercially acceptable cold beverages prepared by the dispersion of a powdered beverage base in refrigerated water. In turn, and amongst other things, a related object of the invention contemplates improvements in apparatus for dispensing powders as well as improved mechanism for mixing or blending them with refrigerated water in machinery of the contemplated type.

It will be appreciated that the powders herein contemplated may contain a high percentage of particles which do not dissolve but which are held, whether desirably or necessarily, in suspension in the ultimate beverage.

Thus to improve the "texture" of the said beverage, the invention contemplates, as a further of its objectives an improved blender for mixing the powders with the liquid; the structure of the blender conducing to homogenization of the beverage as a step in the process by which the present beverage is prepared and delivered; keeping in view the fact that the beverage thus prepared is expected to be consumed within moments of its completion.

A yet further objective is to provide a beverage dispensing machine which includes in its construction one or more units or mechanisms for storing and dispensing powders as well as a blender into which the powders are dispensed and blended with liquid to form a beverage; the final delivery of the said beverage from the blender to a drinking vessel being effected in a manner designed to achieve at least partial homogenization and so impart a desirable degree of uniformity in the texture and palatability of the resultant beverage.

A still further objective contemplated by the invention concerns the provision of a plurality of powder bins clustered around a central axis and respectively oriented for dispensing their contents into the same mixing chamber. Said mixing chamber may have the character of a modified centrifuge in which the liquid and the powders may be spun and it may also have fine jets or ports capable of being opened at an appropriate point in the operative cycle to permit delivery of the mix at high velocity and in fine streams, not only improving the beverage but also accelerating the said cycle.

Other and more specific objects of the invention include provision of the aforesaid machinery of simple and inexpensive construction yet, able to function reliably and efficiently with its storage facilities readily accessible for cleaning, for replenishment, for repair, for replacement, for modification and/or so forth.

An important object of the invention is also to provide the machinery constructed as aforesaid which is readily convertible between refrigerated and heated beverages and which may, in fact, be adapted to produce either of them selectively.

The invention has the still further objective of providing a process for producing a beverage formed by the dispersion of dry powdered ingredients in a refrigerated liquid vehicle; said beverage being thoroughly blended yet rapidly produced in said process.

Figure 2:
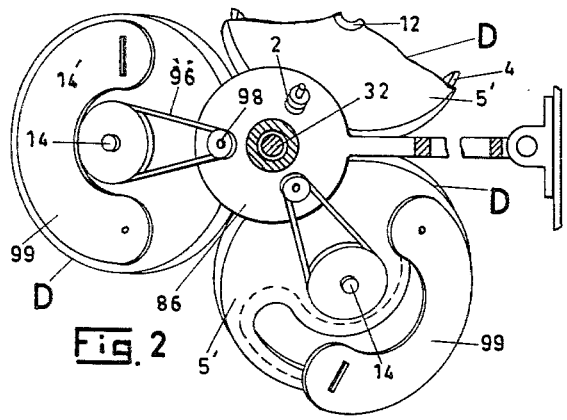
Figure 3:
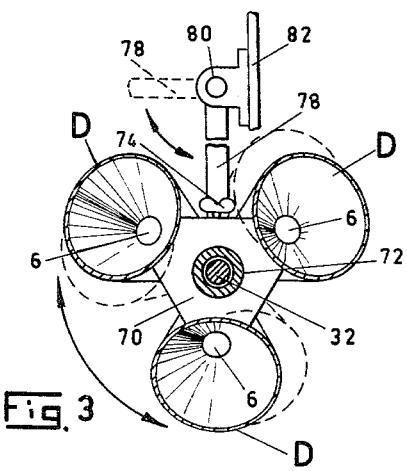
Figure 4:
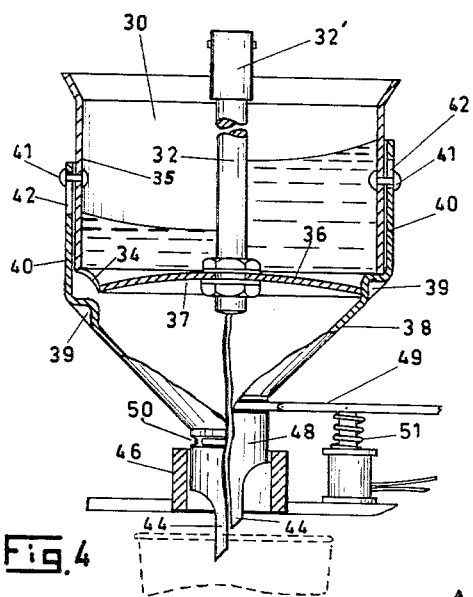
Figure 5:
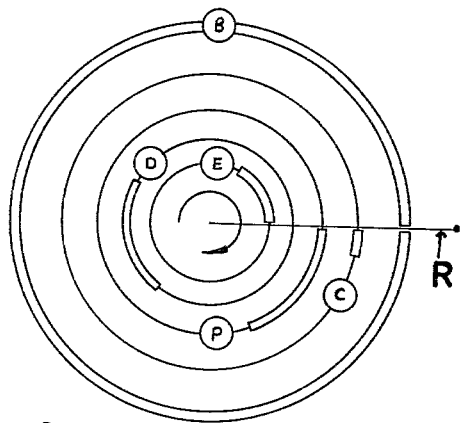
Figure 6:
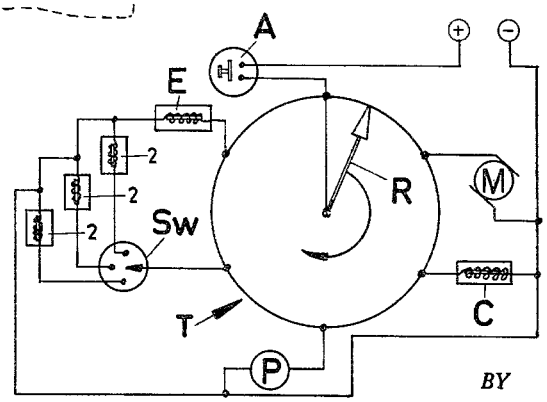
Figure 7:
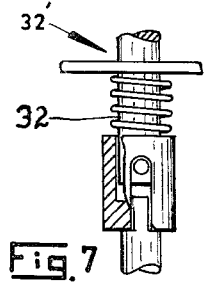

Further and other objects of the invention, more or less broad than the foregoing are, in part, specifically enumerated and, in part, readily apparent from the hereinafter following description of the principles, elements, and parts constituting the present invention of which an exemplary embodiment is herein described and illustrated in the annexed drawing wherein like reference devices refer to like parts of the invention and wherein:

FIG. 1 is a schematic front elevation of the mechanism embodied in the instant machine partly cut away at various points to expose hidden structure, FIG. 2, a section along the line 2—2 of FIG. 1 affording a substantially top plan view of the specific powder storing and dispensing apparatus of the instant machine, FIG. 3, a section along the line 3—3 of FIG. 1 of part and at a lower level of the apparatus shown in FIG. 2, FIG. 4, a side elevational view of the blender and associated parts of the present machine in longitudinal section and longitudinally split to illustrate an operative characteristic thereof, FIG. 5, a cycle of operations diagram indicating the relative timing of the various operations performed by the present machine in producing a beverage, FIG. 6, a schematic diagram of the circuit for the electrically operated elements of the machine, and FIG. 7, a side-elevational view, of a detail of the invention, partly sectioned.

From one viewpoint, the present machine may be regarded as constructed around a spinning blender which effects rapid dispersion of powder in refrigerated water and drains the resultant beverage into a drinking cup completely and quickly.

The machine contemplates one or more readily serviceable and re-fillable powder storage containers which are respectively equipped with metering devices for dispensing the powders into the said blender; the machine being further equipped with selection facilities for discriminating amongst said storage containers and metering devices.

For the purpose of simplifying this submission, the present machine or apparatus is herein regarded and is treated as a composite of several sub-assemblies subordinate to an actuating assembly A which may be coin controlled and which actually initiates a cycle of operative events culminating in the preparation of a beverage and the presentation thereof in a drinking cup.

For example, said sub-assemblies may include a dispensing mechanism D for storing a powdered beverage base and for dispensing it into a blender B in which it is blended with a liquid carrier supplied thereto by pump P; the resultant mixture being evacuated from said blender B through an emptying valve E into a drinking cup delivered by chute C. Obviously and while activating assembly A exercises sovereign control over the entire operative cycle, the various sub-assemblies yet require to be respectively called into and put out of operation by means such as a timer T which holds off-and-on control over a number of electrical sub-circuits, for example, respectively powering the various sub-assemblies hereinbefore described.

Graphic illustrations of the positions of the various sub-assemblies in the structure and in the chain of operations performed by the machine are provided by FIGS. 1, 5 and 6 of the drawing.

The invention further contemplates that a machine may be constructed pursuant thereto with facilities for selectively preparing a plurality of beverages instead of only one; the embodiment chosen for this exemplification being accordingly seen to be equipped with a trio of dispensers D for three different beverage bases; a switch Sw indicated in FIG. 6 being included for selecting the specific dispenser D desired by the operator.

Thus, shortly after actuating mechanism A of FIG. 6 has been rendered operational by the deposit of a coin, for example, and after the setting of selector switch Sw, an appropriate solenoid clutch 2 chosen by and with said selector switch Sw is energized to place the designated dispenser D into operative communication with motor M in a manner which will appear. Each dispenser D comprises, amongst other things a conical container 4 for the powdered beverage base contemplated by the invention; said container 4 having a wide inlet opening 5 with a removable lid 5' and a narrow outlet end 6, to be more particularly described, which is oriented to dispense directly into blender B.

Said dispenser D also contains an axial shaft 10 which is journalled in bearing 12 on lid 5'.

The upper end 14 of shaft 10 projecting through lid 5' carries a driver 14' which is engaged for rotation when solenoid clutch 2 is operated, and an auger 16 is carried on its lower end 16'. In this embodiment the outlet end 6 of the container 4 is constructed to form a housing and, incidentally a bearing for auger 16 at the lower end of shaft 10; the upper end being journalled in bearing 12 as aforesaid.

Between lid 5' and auger 16, shaft 10 may carry an agitator 18 for breaking up or arresting caking of the powdered container contents constituting the beverage base 20 shown in the right hand dispenser D of FIG. 1. That is to say, when shaft 10 is rotated by driver 14' the agitator 18 will disturb the contents in the upper part of the container 4 while auger 16 will dispense them from the lower part thereof into blender B.

Said blender B comprises a cup 30 which is mounted in this embodiment at the lower end of a long spindle 32; said spindle 32 being driven by motor M to spin said cup 30 in continued receiving relation to container 4 of dispenser D. In this embodiment this cup 30 is caused to spin throughout the entire operative cycle of the machine.

When the contents thereof have been mixed for the time predetermined by timer T, they may be evacuated from cup 30 through fine ports 34 formed therein at the juncture of cup wall 35 and the cup base 36 which may be domed slightly as shown in FIG. 4; said ports being occluded during the mixing portion of the cycle but capable of being opened by or contemporaneously with the operation of emptying valve E.

That is to say, the ports 34 may be formed in a frusto-conical fillet 37 constituting the juncture of cup wall and base 35 and 36 and having an angular value corresponding to that of the cone 38 which is disposed in receiving relation to said cup 30 and which carries port stoppers 39 in the form of small embossments, corresponding in number to ports 34—which may be more or less than the two shown in FIG. 4—and dimensioned and strategically arranged to plug said ports 34 when the cone 38 is moved into contiguity with said frusto-conical fillet 37 as indicated by FIG. 4.

The foregoing enumerated parts may be maintained in operative orientation by a conforming guide sleeve 40 telescopically embracing said cup wall 35 and constituting an integral continuation of said cone 38; said guide sleeve 40 being itself maintained in co-rotatable association with cup 30 by means such as integral studs 41 projecting axially from cup 30 through slots 42 in sleeve 40.

Thus, it will be seen that, in the example given, ports 34 may be opened and closed by back and forth movement of said cone 38 axially of and relative to cup 30.

Egress from said cone 38 is provided by a cylindrical spout 44 which is journalled for rotation in a bearing 46 and which joins cone 38 at a thickened collar 48.

It will be recalled that ports 34 are closed and opened by axial movement of cone 38 which is also radially movably by and with cup 30; the spout 44 joining cone 38 being likewise and necessarily axially and radially movable.

The axial movement may be achieved, for example, by means of a device such as fork 49 engaged in annular recess 50 of collar 48 and operable by means such as a solenoid or equivalent to move said collar 48—hence spout 44, cone 38, and sleeve 40—either up or down as required against the bias of spring 51.

Liquid may be introduced into cup 30 in any one of several ways, as for example, by the gooseneck pipe 54 illustrated in FIG. 1.

Thus, after actuating assembly A has been satisfied, timing mechanism T will cause the various aforesaid parts to perform their allotted functions in a predetermined sequence. That is to say, the specific sequence of events visualized by this embodiment of the invention as illustrated in FIG. 6 contemplates that motor M will first be started to spin cup 30 and spindle 32 at relatively high velocity continuously throughout the whole operative cycle. As a next step pump P will preferably be activated to discharge a measured quantity of water into cup 30 and when this water has been brought to a swirl in the spinning cup 30, solenoid clutch 2 will be activated to procure rotation of a dispenser shaft 10 a sufficient number of turns to cause a predetermined quantity of the beverage base 20 selected by switch Sw to be dispensed by auger 16 into the swirling water, thus procuring thin and widely spread distribution of the powder over substantially the whole surface of the liquid in blender cup 30.

In due course, thereafter, timer T will procure movement of cone 38 to open discharge ports 34, permitting the contents of spinning cup 30 to empty into drinking cup 55 under centrifugal force which accelerates such emptying.

It will be understood, of course, that drinking cup 55 will have been deposited by chute C, in its filling position directly below spout 44. However, it will also be of interest that the nature and arrangement of the parts herein visualized permits an operative cycle in which the spout 44 is returned to the elevated position at the right hand side of FIG. 4 at the end of each cycle where it remains until the cup 30 is ready to be emptied when the spout 44 enters said drinking cup 55 and prevents its removal pending completion of the cycle which is preferably timed to permit the complete emptying of cup 30 followed by a return of cone 38 to elevated, cup-closing, position as at the left side of FIG. 4 thus elevating spout 44 out of drinking cup 55 and permitting removal of the latter.

As has been said and as will be apparent from the drawing, the invention contemplates apparatus which is capable of preparing and serving a variety of beverages and, in furtherance of this concept, the instant embodiment is exemplarily equipped with a trio of dispensers D; each respectively complete with container 4, shaft 10, driver 14′, auger 16, and so forth. In this connection, it is believed to be noteworthy that the conical shaping of the respective containers 4 not only permits them to be grouped more or less annularly but it also permits their respective outlet ends 6 to be focussed on cup 30 as aforesaid.

In its present embodiment, the invention contemplates that the spindle 32 is a very elongated member depending axially from the vertically mounted motor M. Dispensers D grouped annularly as aforesaid are interconnected by upper and lower webs 70 mounted for rotation about housing 72 enclosing said elongated spindle 32; means such as set screw 74 being provided for tightening at least one web 70 to said spindle housing 72 when it is desired to prevent rotation thereof as aforesaid.

The spindle housing 72 is supported at its lower terminus 76 between blender B and the outlet ends 6 of containers 4 by the lower cantilever arm 78 extending from a bar 80 which parallels spindle 32 and is rotatably mounted on a wall of cabinet 82. An upper cantilever arm 78′ extending from the top of the bar 80 is secured to motor M with branches 84—84 thereof respectively joining spindle housing 72 above upper web 70 and a cluster bracket 86 disposed between said upper web 70 and motor M and providing a through bearing for said spindle.

The organization of the parts above noted is intended to permit rotation of the grouped dispensers D around spindle housing 72 when and if desired for the exemplary purpose which will appear and it is contemplated that all other parts added to the foregoing structure may be located to avoid interference with such rotation.

Powering of the augers 16 may be effected as shown in FIGS. 1 and 2 of the drawings.

That is to say, a driving element such as gear 90 may be secured for rotation with spindle 32 immediately below cluster bracket 86 and in mesh with each of the gears 92 respectively carried by power take-offs 94 mounted on cluster bracket 86 and corresponding in number to dispensers D included in the instant apparatus.

The driver 14′ for each dispenser D communicates operatively, by means of belt 96 for example, with a companion device such as pulley 98 disengageably coupled by solenoid clutch 2 with power take-off gear 92.

Thus at an appropriate point in the operative cycle of the present apparatus, clutch 2 may be energized to connect pulley 98 to power take-off 94 and so to procure rotation of auger 16 for the period predetermined by timer T.

The parts comprising each dispenser D are preferably also arranged to permit lid 5′ to be removed from container 4 together with shaft 10, auger 16 and any other paraphernalia associated therewith.

It will now be noted that, for all practical purposes motor M, spindle housing 72, and dispensers D, at least, are all supported by cantilever arms 78–78′ by which they may be swung into and out of cabinet 82. The blender B and the parts mechanically connected thereto may, if desired, also travel with the dispensers D; being attached to the lower end of spindle 32. On the other hand a rapid disconnect coupling 32′ may be inserted in spindle 32 between housing 72 and cup 30 enabling said spindle 32 to be temporarily uncoupled from blender B and to be swung independently thereof. By means such as those described, the said containers 4 may then be rotated around spindle 32 to make each of them successively available if necessary or desired, for inspection, cleaning, repair and so forth when said lid 5′ is removed as aforesaid. Refilling may also be accomplished at this time or, alternatively through trap door 99 in lid 5′ while the latter is in place.

The actual duration of a cycle of operations as aforesaid may well be affected by several factors and, indeed, the timing of the several sub-assemblies may also be subject to the same factors. Nevertheless, it is conceived that the said timing may well be more or less as indicated in the cycle of operations diagram of FIG. 5.

That is to say, FIG. 5 contains five concentric circles each respectively denoting the duration of a complete operative cycle; the radius R representing a switch arm, for example, which makes a single 360° sweep in each such cycle beginning and ending at the 3 o'clock position.

Each circle is assigned to one of the sub-assemblies B, C, D, E, and P and each has an arc, emphasized by parallel lines, denoting the "on" time of the assigned sub-assembly as well as its position in the whole cycle.

Thus, it will be seen that blender B runs throughout the entire operative cycle of the present machine whereas sub-assembly C controlling the deposit of a drinking cup 55 starts contemporaneously with the cycle but may stop almost immediately thereafter after having discharged its function.

The diagram of FIG. 5 also emphasizes the facts that a short interval of time is allowed to elapse between the delivery of water by pump P and the subsequent deposit of powder 20 into cup 30 by dispenser D whereby to allow the water therein to be first brought to a swirl in the spinning cup 30. Similarly the operation of the emptying valve E at the end of the cycle is deferred until the powder 20 deposited by dispenser D has been thoroughly dispersed in said swirling water.

The mechanism hereinbefore described constitutes a preferred implementation of that portion of the inventive idea which is concerned with means for putting into effect the process constituting the other part of the invention.

It is quite conceivable, of course, that the specific structure disclosed may be varied in numerous respects without departure from the basic mechanical invention.

On the other hand, it is equally conceivable that the process may be carried out more or less efficiently by means other than those herein specifically disclosed.

Due regard should therefore be had to these factors in any assessment of the true scope of the present invention.

What I claim is:

1. Apparatus for preparing and serving beverages including:

A blender for dispersing a beverage powder in a liquid to prepare the beverage;

A cup forming part of said blender wherein the beverage powder is dispersible in said liquid, said blender cup having a bottom port through which its contents are dischargeable into a drinking cup;

Means for delivering a measured quantity of liquid from a supply to said blender cup;

Means for dispensing a measured quantity of powder from a supply to said blender cup after delivery of the liquid thereto;

A timer;

A driver forming part of said blender operable and timed by said timer to bring the liquid in the blender cup to a vigorous swirl before the dispensing of the powder to spread the powder thinly over the surface of the swirling liquid when dispensed as aforesaid and thereafter to continue swirling the combined contents of the blender cup for a predetermined period to complete dispersal of the powder in the liquid, and Structure for depositing a drinking cup at a filling position to receive the contents of said blender cup.

2. Apparatus as claimed in claim 1 further comprising:

A closure for said bottom port operable in timed relation to said driver to be opened and permit discharge of said blender cup contents into said drinking cup at the end of said period.

3. Apparatus for preparing beverages as set forth in claim 1 including;

Means for occluding the said bottom port during blending of the blender contents.

4. Apparatus for preparing beverages as set forth in claim 1 wherein said dispensing means includes:

A powder container;

A metering device operable to dispense powder from said container, and

An agitator co-operable with said metering device for agitating powder in said container.

5. Apparatus for preparing and serving beverages including:

A blender for dispensing a beverage powder in a liquid to prepare the beverage;

A cup forming part of said blender within which the beverage powder is dispersible in said liquid, said blender cup having a bottom port through which its contents are dischargeable into a drinking cup;

Means for delivering liquid from a supply to said blender cup;

A dispenser operable to dispense beverage powder from a supply into said blender cup;

A driver forming part of said blender operable to swirl said liquid and powder contents of said blender cup to disperse the powder in the liquid, and A timer for effecting the delivery of a measured quantity of liquid into the blender cup, the dispensing of a measured quantity of said beverage powder into the blender cup, operation of said driver until said beverage powder is dispersed in said liquid to prepare said beverage, and the discharge of the beverage from the blender cup into a drinking cup as aforesaid;

Said timer being adjusted to procure operation of the driver to bring the liquid in the blender cup to a vigorous swirl before the dispensing of the beverage powder, thus to effect relatively wide distribution of the said beverage powder over the surface of the swirling liquid.

References Cited by the Examiner

UNITED STATES PATENTS

| 1,208,058 | 12/1916 | Warriner | 222—241 X |
| 2,569,486 | 10/1951 | Mills | 222—144.5 X |
| 2,832,510 | 4/1958 | Hill | 141—174 X |
| 2,852,043 | 9/1958 | Cooper | 141—174 X |
| 2,855,007 | 10/1958 | Erickson et al. | 141—74 |
| 2,879,042 | 3/1959 | Jones | 222—70 X |

FOREIGN PATENTS 467,526  10/1928  Germany.

LAVERNE D. GEIGER, *Primary Examiner.*

SAMUEL ROTHBERG, *Examiner.*

E. EARLS, *Assistant Examiner.*